US006587748B2

(12) United States Patent
Baack

(10) Patent No.: US 6,587,748 B2
(45) Date of Patent: Jul. 1, 2003

(54) AUTOMATED PARTS DISPENSING SYSTEM

(76) Inventor: B. John Baack, 17561 Santa Cristopal St., Fountain Valley, CA (US) 92708

( * ) Notice: Subject to any disclaimer, the term of this patent is extended or adjusted under 35 U.S.C. 154(b) by 114 days.

(21) Appl. No.: 09/933,296

(22) Filed: Aug. 20, 2001

(65) Prior Publication Data

US 2003/0034353 A1 Feb. 20, 2003

(51) Int. Cl.[7] .................... G06F 17/00

(52) U.S. Cl. .................... 700/237; 700/243; 700/244; 221/7; 221/9; 221/119

(58) Field of Search .................... 700/231–244; 221/7, 9, 119

(56) References Cited

U.S. PATENT DOCUMENTS 3,933,231 A * 1/1976 Vinet .................... 194/241
4,812,985 A * 3/1989 Hambrick et al. .......... 700/215
4,961,507 A 10/1990 Higgins .................... 221/129
5,072,380 A * 12/1991 Randelman et al. .......... 705/13
5,205,436 A 4/1993 Savage .................... 221/7
5,438,523 A 8/1995 Humm et al. .............. 364/479
5,441,165 A 8/1995 Kemp et al. ................ 221/2
5,738,243 A 4/1998 Broadstreet .................. 221/2
6,505,754 B1 * 1/2003 Kenny et al. ............... 221/13

* cited by examiner

*Primary Examiner*—Khoi H. Tran
(74) *Attorney, Agent, or Firm*—Dennis W. Beech

(57) ABSTRACT

The automated parts dispensing system and method includes a dispensing device in communication with a parts vending system. The dispensing device is one of the commonly known machine for dispensing parts, tools, foods, novelty items and other such items which generally use a helical coil or robotic delivery system. The particular device disclosed is a carrousel or drum type device. The dispensing device is modified to detect the rotation and position of the drum element and to detect the delivery of parts. The parts vending system controls and monitors the dispensing device or devices to assure proper operation and authorization of users. The user is aided in the requesting for parts by the correlating of vehicle identification number and identified operations or part type. This relieves the user of the task of identifying a particular configuration of part where vehicle models may have variations by vehicle identification numbers, etc. The parts vending system may also be in communication with a dealer management system to account for inventory, billing, status and other management functions, as well as, a bulk fluid management system.

13 Claims, 5 Drawing Sheets

AUTOMATED PARTS DISPENSING SYSTEM

BACKGROUND OF THE INVENTION

1. Field of the Invention

This invention relates to devices used to dispense articles such as parts, tools, foods and other items. The new device provides a means to correlate and dispense parts, parts kits and the like required for service or repair with a particular motor vehicle.

2. Description of Related Art

There are currently known many dispensing devices and associated systems for parts, tools, foods, money and other items. One such example is that disclosed in U.S. Pat. No. 5,205,436, Issued Apr. 27, 1993. This system uses known dispensing mechanisms such as helical coil and robotic delivery. Other known systems which could be used are the carrousel or drum devices.

Systems such as this have a secure means for dispensing articles only to authorized users. The known art requires the user, in the case of parts or parts kits to know which specific part is required for a task. In some instances a list of articles in the dispensing machine is provided on an electronic display. Also such dispensing machines may include manual searching or recording means as for example in U.S. Pat. No. 5,438,523, Issued Aug. 1, 1995.

All of the known systems require the user to personally identify the specific part required for a given application. This is true even for more specific vending machines such as disclosed in U.S. Pat. No. 5,738,243, Issued Apr. 14, 1998 which is intended to dispense small parts for airplanes.

The present invention may use existing dispensing machine apparatus such as the drum device to store and dispense parts, parts kits, and other service and repair items as well as special design devices. The apparatus is modified to monitor the quantity and location of parts, kits and the like articles. The system further has a means to match vehicle identification numbers to the configuration of the article necessary to perform a particular repair or service. The user may enter a repair order number and a desired repair operation, or a general kit or part type identification which the system will correlate to make available the correct article for the particular configuration of vehicle specified. Thus the user isn't required to know the model variations of various vehicles or vehicle identification number, but can use the repair order number to cause the system to present the proper part for the selected application, as an example, the user may ask for front brakes to which the automated parts dispensing system would present the proper front brake for the specific vehicle.

Such a system is particularly important in differentiating between various years and models of vehicles that may have little or no differences to the observer, but different specific parts requirements. The present invention can reduce the time a mechanic or system user must spend to correctly copy and re-input a vehicle serial number to assure proper parts and other articles are obtained for a repair. The system will also thereby reduce contact requirements with a facility parts department.

SUMMARY OF THE INVENTION

One object of the present invention is aiding of a user of a dispensing device in correlating a vehicle configuration to an article required for service or repair of the vehicle. Another object is storage and automated inventory of articles. A further object is secure access identification of users and dispensing of the correct article. Yet another object is reduction of the time required for a user to acquire the correct articles for repair of a vehicle. A further object is to reduce the time personnel in a facility parts department are required to spend in dispensing and inventorying parts and parts requested.

In accordance with the description presented herein, other objectives of this invention will become apparent when the description and drawings are reviewed.

DESCRIPTION OF THE PREFERRED EMBODIMENT

Figure 1:
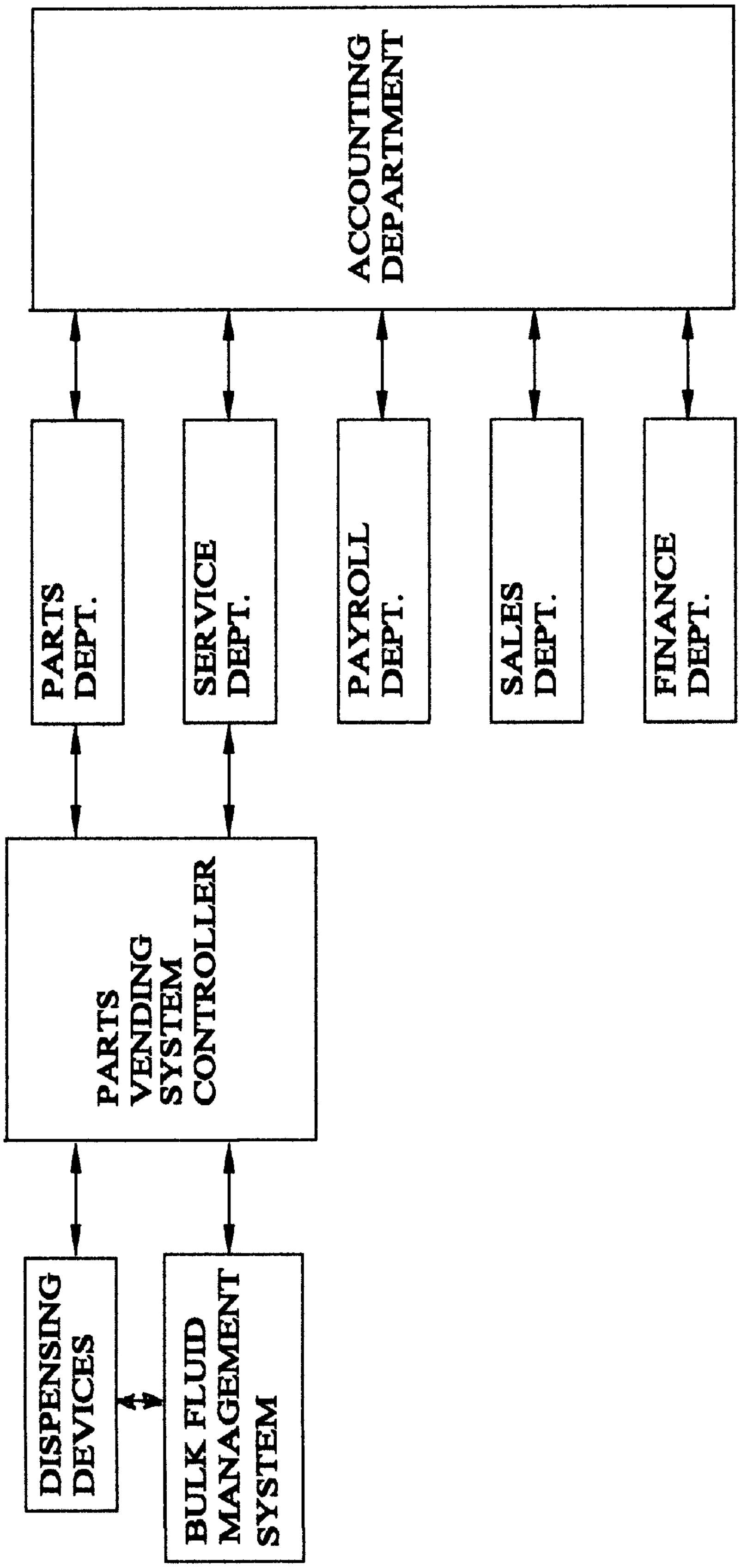
FIG. 1 illustrates a functional diagram of the automated parts dispensing system.
Figure 2:
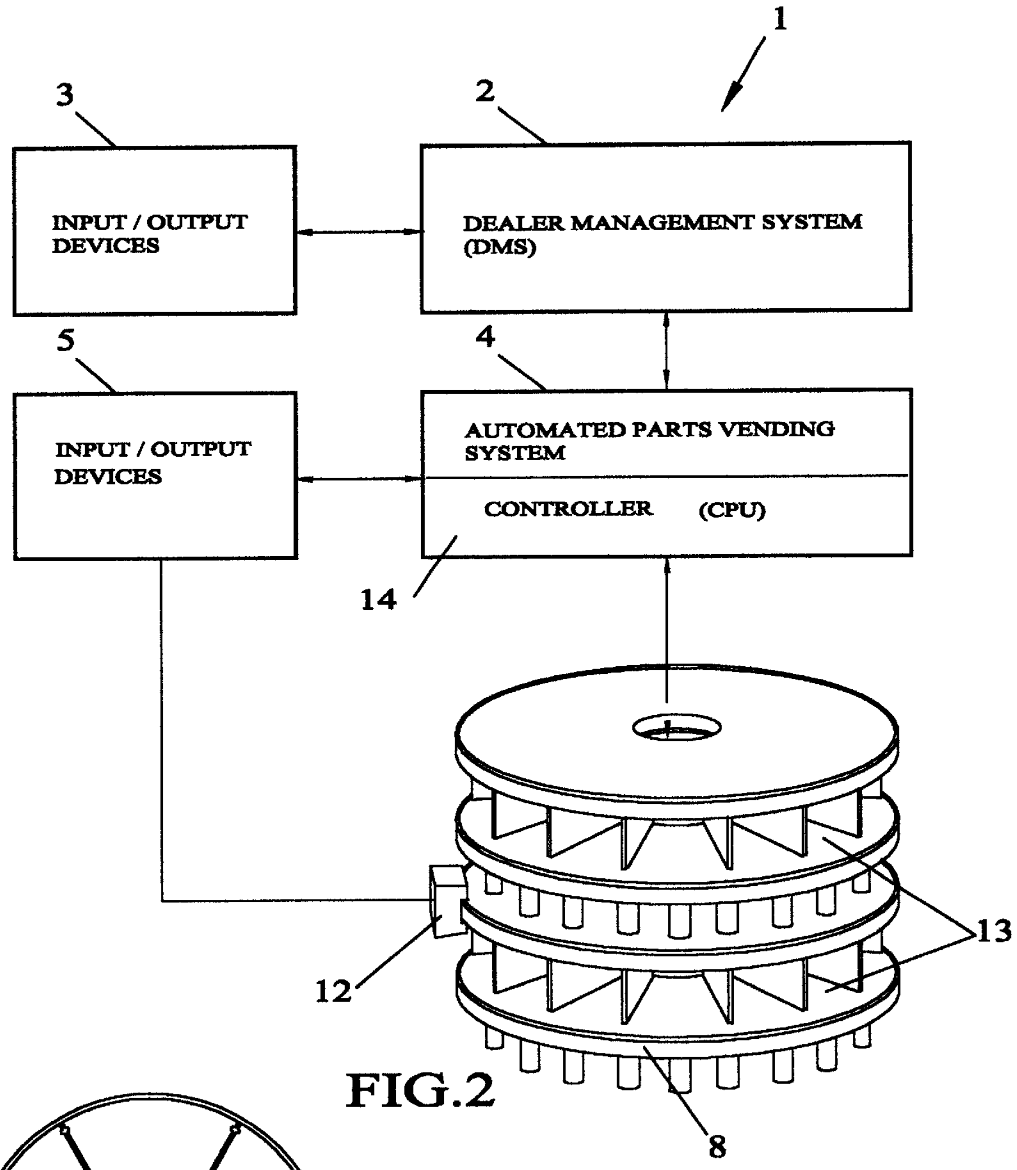
FIG. 2 illustrates schematic diagram of the system.
Figure 3:
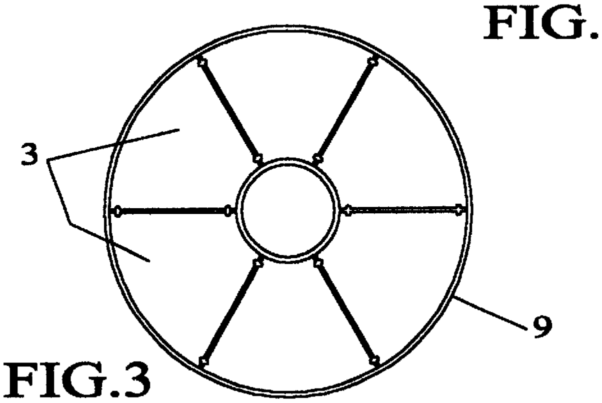
FIG. 3 illustrates a top plan view of a shelf configuration.

The automated parts dispensing system may use available storage and dispensing devices to store, control and provide requested parts to a user as well as account and bill for parts used. For this embodiment parts include but are not limited to: individual parts; parts kits for service or repair; special tools for an operation; information for use of bulk fluids such as lubricants or in the instance wherein an automotive fluids management system is incorporated, authorization for a quantity of fluids such as engine oil, gear oil, etc. from a bulk storage container; and other items required for service or repair of a vehicle. As presented herein below a motor vehicle or automobile application of the system will be described; however, use in other applications is also possible.

Referring to FIGS. 1 through 5, the automated parts dispensing system or APDS 1 includes a dealer management system 2 with input/output devices 3 in communication with an automated parts vending system 4 with input/output devices 5 and a storage and dispensing device 6 controlled by the parts vending system 4. The input/output devices 3, 5 may be any of the commonly understood equipment types as well as voice activated equipment The dealer management system 2 includes devices and general purpose computers for ordering, inventory and sale of automobiles and associated parts and service as well as for general accounting and payroll. This information or data base is in communication with input/output devices 3 maintained within the dealership and perhaps the manufacturer supplier. Operations within the dealership which interface with this system include the service department and the parts department. The service department normally uses repair orders to account for work scheduled and in progress or completed. As well as parts required to properly maintain and repair vehicles. The dealer management system 2 and automated parts vending system 4 may be integrated as one system to control and account for parts and service.

Figure 4:
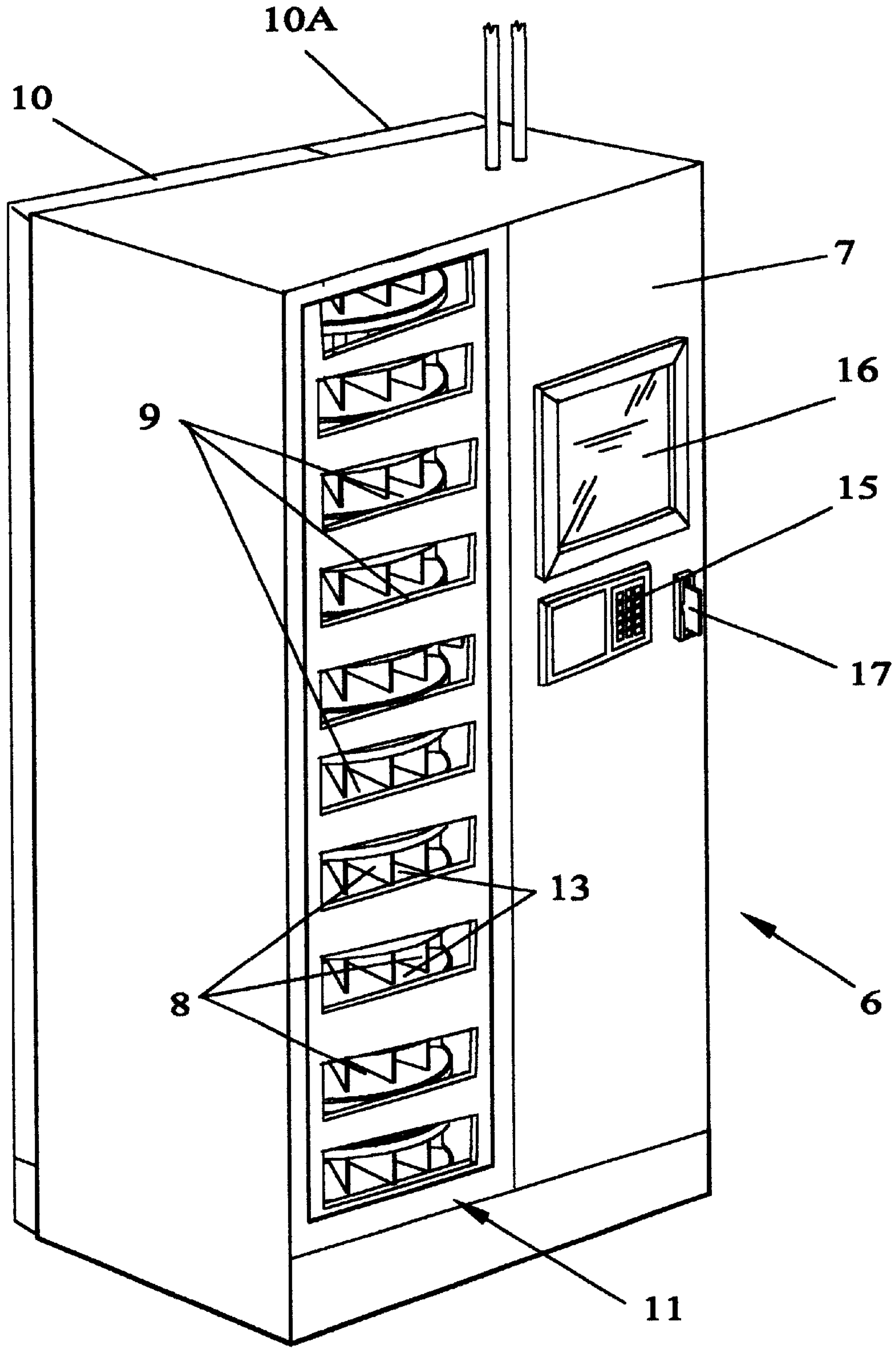
FIG. 4 illustrates a front perspective elevation view of the dispensing device.
Figure 5:
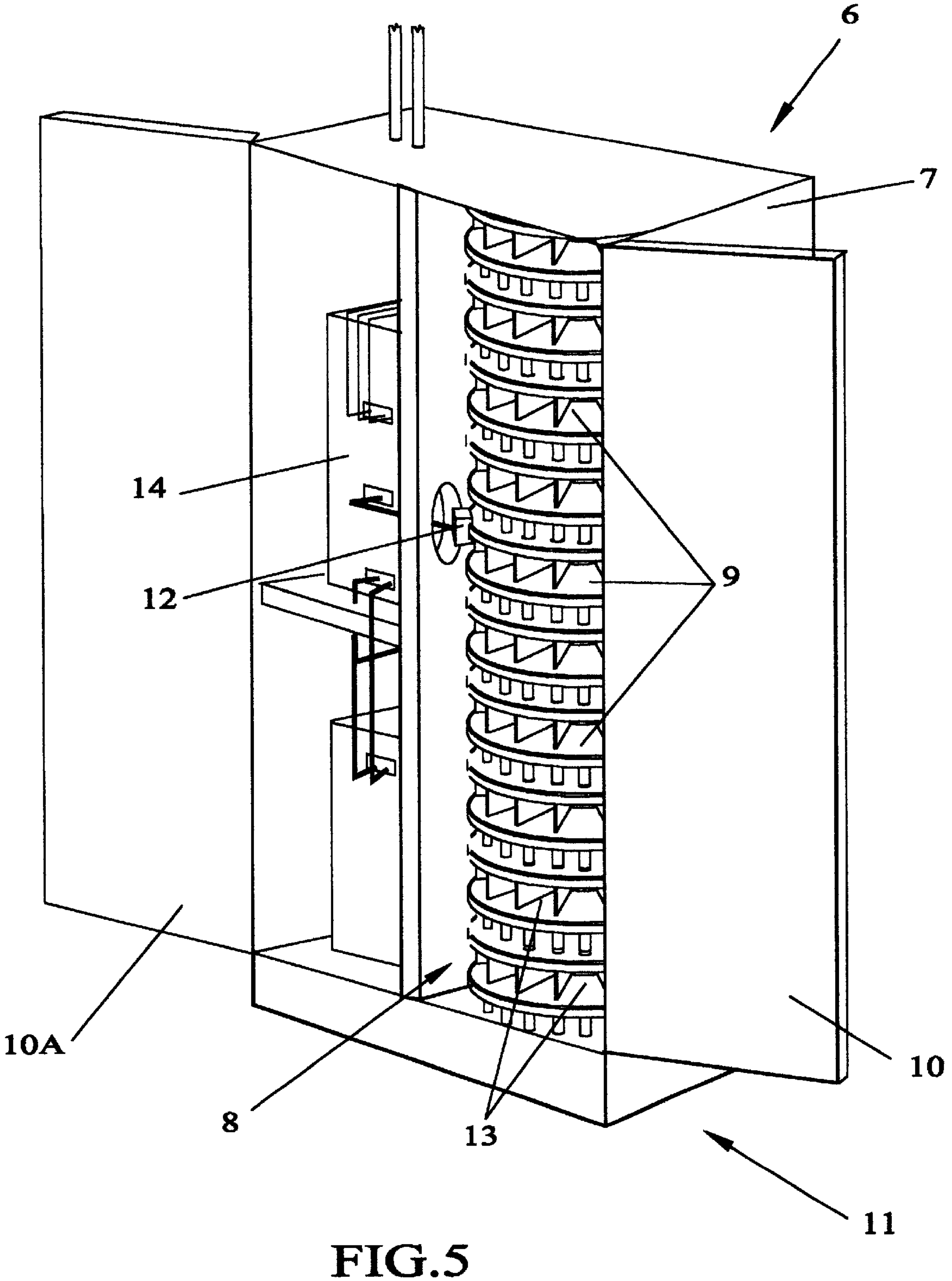
FIG. 5 illustrates a back perspective elevation view of the device.

One of the functions of the parts department of the dealership is support to the service department for parts necessary to accomplish servicing of vehicles. In the preferred embodiment the sale, management and accounting of parts is augmented by the automated parts vending system 4. The dispensing device 6 as illustrated in FIGS. 4 and 5 is of the carrousel or rotating drum type having an enclosure 7 a motorized drum element 8, securable access doors 10, parts resupply access 11 from the front or rear and drum position sensors 12. The drum element 8 has one or more storage shelves 9. While a carrousel type dispensing device is used for descriptive purposes, other dispensing devices as described herein as well as special design devices may be used depending on the type and quantity of parts to be dispensed. In the case of a carrousel type device a motor for rotation would be controlled by controller 14.

The dispensing device 6 as typically understood is modified to sense the position of the drum element 8. This may be accomplished with electromechanical, optical, laser or the like type switches. The shelves 9 or trays are partitioned into sections or compartments 13 as for example in FIG. 3 for storage and dispensing of multiple quantities and types of parts in a given shelf 8 with each having a unique address for controller 14. Other articles may also be stored in a compartment 13 as for example an authorization order for bulk fluids such as oil or a voucher for a mechanical part, which is too large to be placed in a compartment 13. As a part or other article is dispensed the position sensor 12 and associated controller 14 count or by other means monitor the position of the drum 8 and shelves 9.

Figure 6:
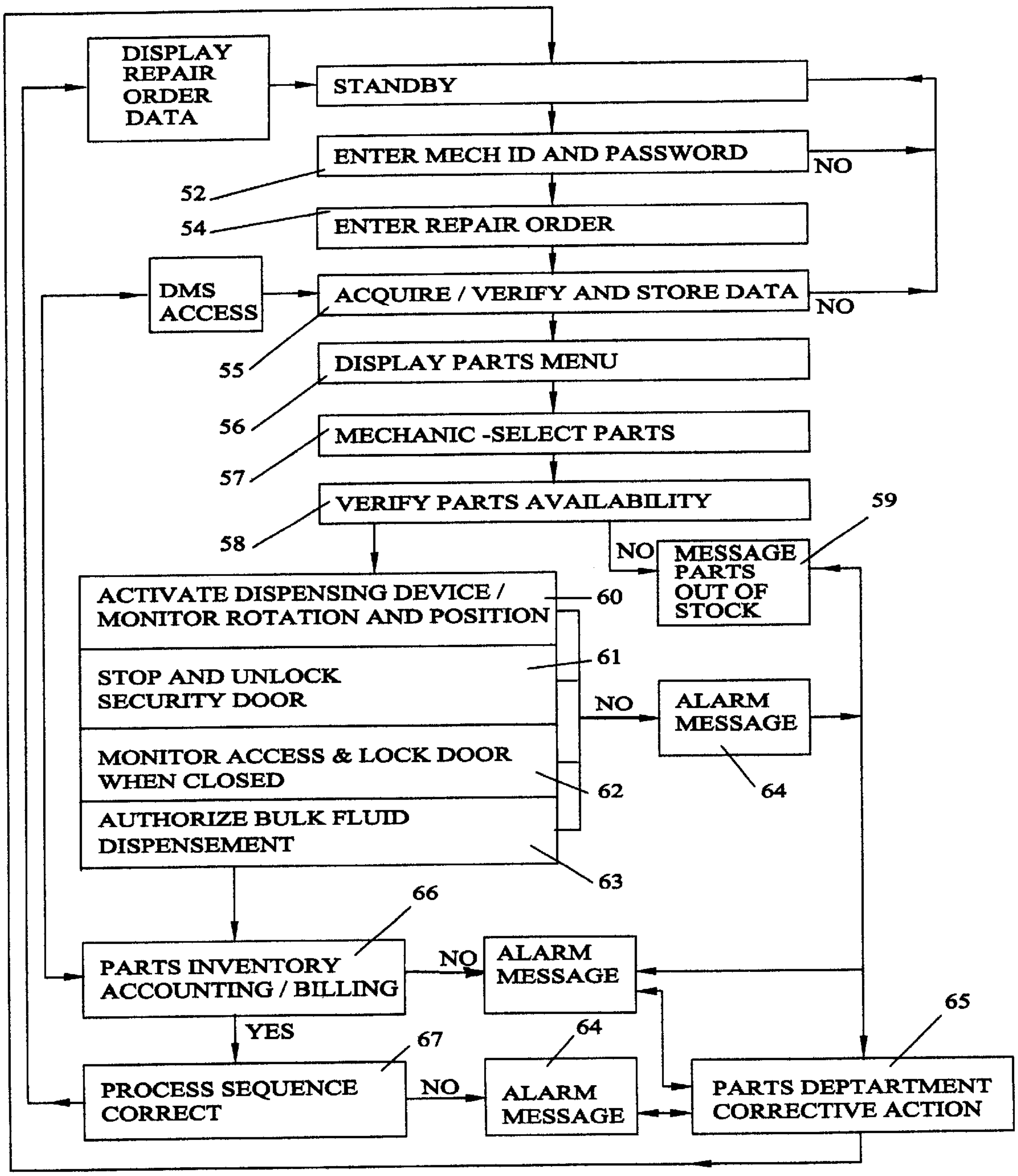
FIG. 6 illustrates a representative flow diagram of the method of the present invention.

Referring to FIGS. 4 through 6, the dispensing device 6 has an input device 15, a display device 16 and a card reader 17 for interface by a user. The user will typical enter the mechanic identification number and password 52. If this data is correct the user then enters the repair order number 54. The dealer management system 2 then: determines the user is assigned to the repair order; accesses the vehicle identification number that was entered when the repair order was created or at the time of vehicle purchase; checks the vehicle status; and stores the data for later use. The available parts categories are then displayed for the user 56. The user may also enter the part or operation to be performed and receive a display of parts available for the specific vehicle. The automated parts vending system 4 retains the vehicle identification number for use in checking for the correct selection by the user of parts and fluids.

Based on the displayed information the user then selects the desired part, parts or parts categories using a keypad 15 or similar data entry device 57. The part selected is then found as to location 58 by for example using the vehicle identification number to correlate with the user's selection or, if not available, a message is transmitted to the parts department 59. If the part position is located, the control device 4 activates the dispensing device 6 and rotates the drum 8 to an access door 10 at step 60. If the rotation is correct, the access door 10 is unlocked 61. The time to access and the opening of the access door 10 are monitored to determine if the access door 10 is opened and closed or a specific time has elapsed. The access door 10 is normally spring biased for automatic closing unless it is jammed or blocked or being tampered with. The occurrence of either event is detected by the controller 4 wherein when the door is closed it is locked 63. In the instance when the system is controlling the dispensing of fluids using a bulk fluid management system, the system controls the authorization of the quantity of fluid to perform the necessary operation on the vehicle and as for other parts bills for the quantity.

In the instance that steps 62 or 63 are not completed, an error message is communicated and alarm initiated 64. If the access door 10 is then closed and locked the process is continued. In the event this condition is not met, the parts department is signaled to take corrective action 65. Such actions may include the parts supervisor correcting the error message received, taking direct control of the system, deactivating the alarm, testing and resetting the system elements or if necessary suspending operation to repair the system.

If the part has been timely removed or the access door 10 has been opened and closed, the automated parts vending system 4 then reduces the part quantity of the dispensing device 6 and initiates a billing for the part, fluid or the like as an element of the repair order 66. This data is then communicated to the dealer management system 2 which adjusts the dealership overall parts inventory, orders new parts if necessary, and inputs the parts costs as part of the total repair order cost to be billed to the customer. The parts and repair order status is communicated to input/output devices 3, 5 as requested.

As can be understood the service and repair parts include parts, parts kits, special tools, lubricants and other elements. In the case of lubricants, such as oil and grease which may be dispensed from a reservoir to an application line and dispensing device, the automated parts vending system 4 communicates information as to the amount of fluid that should be used for the service as a voucher, which is verified and billed, control function to a bulk fluid management system or other action. The controller 14 functions may be partitioned between the automated parts vending system 4 and dispensing device 6 or devices. Depending on the capability of the equipment, existing or special design, and the requirements of the user the function may be primarily centralized, decentralized or otherwise distributed.

The automated parts dispensing system and method may use other dispensing devices than the carousel as described in the preferred embodiment. The dispensing device would be adapted or new devices designed to interface with the automated parts vending system. Variations in dispensers might serve to dispense other types, sizes and quantities of parts, for example, small parts in small or large quantities and large or heavy parts in small or large quantities. Also fluid-dispensing system may be used.

For parts that are not compatible with known dispensing devices, such as the carrousel type, due to size, weight, quantity, form and the like, a voucher system may be used to control dispensing of parts, parts kits, fluids and other items. The steps described in the process would be similarly used except the dispensing device would provide access to a voucher that would give priority service for the user at a parts department. Instead of a voucher a key may be dispensed which would provide access to a storage locker or other automated device containing the item to be retrieved.

The use of a voucher or key might also be implemented to include customer service for special order parts. Such parts could be staged, located and prepared for billing using a voucher or key. Such a combined system would allow warehouse personnel to handle redundant and predictable tasks while making experienced parts department counter personnel time to concentrate on unique, special and difficult tasks.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A system for dispensing parts associated with vehicle service and repair comprising:

a parts vending system with input and output devices, and in communication with a dispensing device; and a vehicle identification parts correlation process as part of the parts vending system.

2. The system as in claim 1 wherein the parts vending system is in communication with a dealer management system.

3. The system as in claim 1 wherein the parts vending system comprising an enclosure, an access door, a resupply door, and a drum element having a position sensor and a controller with the drum element partitioned to form a plurality of compartments.

4. The system as in claim 3 wherein the enclosure having a means for securing.

5. The system as in claim 3 wherein the dispensing device having a data input device and a data display device.

6. The system as in claim 3 wherein a means for delivering parts including placing a plurality of parts in the compartments, a means for rotating and sensing the rotation of the drum element and a means to receive data regarding requested parts and vehicle identification.

7. The system as in claim 1 wherein the parts vending system is in communication with a bulk fluid management control system.

8. The system as in claim 3 wherein the parts vending system further includes a means for computing inventory of items present in the dispensing device.

9. A method for dispensing parts for use in service and repair of vehicles comprising the steps of:

a) providing a system including a parts vending system in communication with a dispensing device having a data input device and a data display device;

b) entering a mechanic identification number and password and verifying access;

c) entering repair order data and verifying access;

d) entering part information data;

e) selecting the desired part for the vehicle;

f) rotating a drum element to position a chamber at an access door;

g) releasing the access door and monitoring for door opening and time to access;

h) securing the door if the access door is opened and closed or time to access has elapsed; and i) accounting for inventory and sales, and billing for delivered parts.

10. The method in claim 9 further comprising the steps of:

returning the parts inventory system to a ready state if the data entered in steps b, c, d or e is incorrect.

11. The method in claim 9 further comprising the steps of:

sending an error message if the drum element is not positioned properly.

12. The method in claim 9 further comprising the steps of:

sending an error message in the event step i is not completed.

13. The method as in claim 9 further comprising the steps of:

displaying available parts inventory based on data entry.

* * * * *